United States Patent Office 3,476,647
Patented Nov. 4, 1969

3,476,647
GROWTH PROMOTING METHOD FOR
MICROORGANISMS
Tsunezo Ushioda, 2—448 Horinouchi, Suginami-ku,
Tokyo, Japan, and Katsuhiko Nonaka, 21 Otsuto-
mocho, Minoru Yasuhara, 44 Otsutomocho, and
Katsuya Sato, 303 Teramaecho, all of Kanazawa-
ku, Yokohama-shi, Kanagawa-ken, Japan, and
Takeshi Inoi and Hiroaki Ishibashi, both of
44 Otsutomocho, Kanazawa-ku, Yokohama-shi,
Kanagawa-ken, Japan
No Drawing. Filed Dec. 20, 1966, Ser. No. 603,165
Int. Cl. C12k 1/00
U.S. Cl. 195—80                           7 Claims

ABSTRACT OF THE DISCLOSURE

A method for promoting the growth of microorganisms by adding to the culture medium, a small amount of 2 - oxo - 4 - methyl - 6 - preido-hexahydropyrimidine (which is a condensation product of urea and acetaldehyde or crotonaldehyde) or/and 2-oxo-4-methyl - 6-hydroxy-hexahydropyrimidine (which is a hydrolyzate of the former) to accelerate the growth of micoorganisms.

---

This invention relates to a method for promoting the growth of microorganisms. More particularly this invention relates to a method for promoting the growth of microorganisms, especially at the initial stage by applying 2-oxo-4-methyl-6-ureido - hexahydropyrimidine and/ or its hydrolysate, 2-oxo-4-methyl-6-hydroxy - hexahydropyrimidine. They will be abbreviated hereinafter as CDU and OMHP, respectively.

Recently the weight of fermentation processes in which various kinds of microoragnisms are used, is increasing year after year in the chemical industry. In such processes, the growth promotion of microorganism is a very important economical problem because it has the direct connection with the shortening of operational time.

Heretofore various kinds of chemical compounds such as vitamines, amino acids or the like have been used for promoting the growth of microorganisms. However, most of such growth promoting substances have ben expensive and not suitable in the commercial operation.

Accordingly it is an object of the present invention to provide a method for promoting the growth of microorganism with an inexpensive commercially attractive substance.

It has now been discovered by the present inventors that CDU or OMHP has a physiological activity, especially growth stimulating effect on various kinds of microorganisms in the presence of sufficient amount of nitrogen source such as ammonium type, nitrate type or other nitrogen type compound, carbon source such as glucose, saccharose or the like and mineral elements in the form of e.g. $P_2O_5$, $K_2O$, CaO, MgO or the like. In other words, it has been found that the above-mentioned object can be attained by the method of the present invention in which CDU and/or OMHP is added to a culture medium in an amount effective to accelerate the growth of micoorganism.

The CDU is a condensation product of urea and acetaldehyde or crotonaldehyde and has been used as a slow-releasing nitrogen fertilizer. The OMHP is preferably prepared by hydrolysis of CDU, although other method such as saponification of corresponding β-ureido aldehyde-acetal is known e.g. in Monatschefte für Chemie, Bd. 96 [6], P.1951 (Zigeuner and Rauter). Accordingly, both CDU and its hydrolysate OMHP are very cheap materials and can be obtained from a commercial scale plant now.

The effective dosage of CDU and/or OMHP in a culture medium is essential for the practice of the present invention. In general, good results are obtained when the culture medium is modified with CDU and/or OMHP in an amount of from 1 to 200 p.p.m., depending upon the species of microorganisms and condition of culture.

In addition to the physiological effect, since it releases nitrogen, it can be used as a nitrogen source in an amount more than above-specified.

As regards medium, there is no limitation. Any culture medium customarily used in the fermentation can be used in the present method. The term "microorganism" as used throughout the present specification and claim is intended to include bacteria, actinomycetes, fungi and yeast.

The following examples will be given to illustrate the present invention but it should be understood that they are by no means intended to restrict the scope of the invention.

EXAMPLE 1

Growth promoting effect of CDU on *Aspergillus niger*.

*Aspergillus niger* was inoculated at the rate of a loopful per flask into 30 ml. of a culture solution in a 100 ml. cotton plug Erlenmayer flask. The culture solution contained 25 ml. of Czapek's medium containing 2 g. of $NaNO_3$, 25 g. of saccharose, 1 g. of $K_2PO_4$, 0.5 g. of $MgSO_4 \cdot 7H_2O$ and 0.05 g. of $FeSO_4$ in one liter (pH=5.0) which had been autoclaved and 5 ml. of an aqueous solution of CDU which had been sterilized by ultra-violet irradiation. In case of control run 5 ml. of sterilized water was used instead of the aqueous solution of CDU.

The inoculated flasks were put in a room constantly kept at 30° C. After 14 days of culture period, the cells were harvested.

The cells were dried at a temperature of 80–90° C. and after measuring their dry weights, their nitrogen contents were determined by semi-micro Kjehldahl method. The results of these tests expressed in averages of each 5 replicates are shown in Table 1.

TABLE 1

| Concentration of added CDU (p.p.m.) | Dry weight (mg.) | Nitrogen in cells (mg.) |
|---|---|---|
| (Control) 0 | 124(100) | 4.44(100) |
| 5 | 173(140) | 6.03(136) |
| 10 | 180(145) | 6.24(141) |
| 50 | 183(148) | 6.01(135) |

Figures in parenthesis indicates growth index based on rating of "100" for control.

EXAMPLE 2

Growth promoting effect of CDU on *Penicillium funiculosum*

Experimental method was the same as in Example 1. The results shown in Table 2 are averages of 4 replicates.

TABLE 2

| Concentration of added CDU (p.p.m.) | Dry weight (mg.) | Nitrogen in cells (mg.) |
|---|---|---|
| (Control) 0 | 114(100) | 2.48(100) |
| 10 | 180(158) | 4.33(175) |
| 20 | 178(156) | 4.27(172) |

EXAMPLE 3

Growth promoting effect of CDU on *Bacillus subtilis*

10 ml. of a pre-cultured cell suspension of *Bacillus subtilis* was inoculated into 80 ml. of the nutrient solution of the following composition (Table 3) in a 300 ml. cotton plug Erlenmayer flask, after auto-claving. 10 ml. of an aqueous solution of CDU which had been sterilized by ultraviolet irradiation was added to them. In the control run, 10 ml. of sterilized water was used instead of the aqueous solution of CDU.

The inoculated flasks were put in a room constantly kept at 30° C. After 12 days of culture period, the cells were harvested. The cells were dried at 80–90° C. and their dry weights were measured. The results of the tests expressed in averages of each 3 replicates are shown in Table 4.

TABLE 3
Composition of the nutrient solution for *B. subtilis*

| | Percent |
|---|---|
| Glucose | 5 |
| Sodium citrate | 0.5 |
| Monoammonium phosphate | .2 |
| Potassium chloride | 0.15 |
| Magnesium sulfate | 0.05 | pH=6.5.

TABLE 4

| Concentration of added CDU (p.p.m.) (control): | Dry weight (mg.) (mg.) |
|---|---|
| 0 | 157 (100) |
| 5 | 169 (108) |
| 10 | 196 (125) |
| 20 | 184 (117) |

EXAMPLE 4

Growth promoting effect on *Saccharomyces sake* No. 6

10 ml. of pre-cultured cells of *Saccharomyces sake* No. 6 was inoculated into 170 ml. of Haydack's medium in a 500 ml. flask, after autoclaving. 10 ml. of an aqueous solution of CDU which had been sterilized by ultra-violet irradiation was added thereto. In the case of control run, 10 ml. of water was used instead of the aqueous CDU solution.

The inoculated flasks were incubated at 28° C. on a shaking machine. After 24 hours of culture period, the cells were harvested by centrifugalizing.

The cells were dried at 80–90° C. and after measuring their dry weights, their nitrogen contents were determined by semi-micro Kjehldahl method. The results of these tests expressed in averages of each 3 replicates are shown in Table 5.

TABLE 5

| Concentration of added CDU (p.p.m.) | Dry weight (mg.) | Nitrogen in cells (mg.) |
|---|---|---|
| (Control) 0 | 55.0(100) | 5.93(100) |
| 10 | 68.3(123) | 7.29(123) |
| 20 | 85.3(155) | 8.76(144) |

EXAMPLE 5

Growth promoting effect of CDU on baker's yeast 170 ml. of liquid culture of Haydack (pH=5.0) which had been sterilized in an usual manner and 20 ml. of an aqueous solution of CDU which had been sterilized by ultraviolet irradiation were introduced in a 500 ml. shaking flask. (In the control run, a 20 ml. sterilized water was added instead of an aqueous solution of CDU.) The baker's yeast which had been subjected to a pre-culture for 12 hours in a test tube containing 10 ml. of Haydack solution, was added to the content of the above-mentioned shaking flask. After the shaking culture for 24 hours at a temperature of 28° C., the growth of cells was measured. The results of these tests expressed in averages of each 3 replicates are shown in Table 6.

TABLE 6

| Concentration of added CDU (p.p.m.) (control): | Weight of fresh material (relative value), g. |
|---|---|
| 0 | 1.43 (100) |
| 5 | 1.49 (104) |
| 10 | 1.60 (112) |
| 50 | 1.57 (110) |

EXAMPLE 6

25 ml. of Czapek culture solution having been prepared and sterilized as usual and 5 ml. of an aqueous solution of OMHP having been sterilized by ultra-violet irradiation were introduced in a 100 ml. cotton plug Erlenmayer flask. In the case of control run, 5 ml. of sterilized water was added instead of 5 ml. aqueous solution of OMHP. A loophole of spores of *Aspergillus niger* or *Penicillium funiculosum* was inoculated thereinto. The inoculated flasks were put in a room kept at a temperature of 30° C. for 14 days and then the cells were harvested. The dry weights of the cells and their nitrogen contents (by way of semi-micro Kjehldahl) were measured. Averages of each 4 replicates are shown in Tables 7 and 8.

TABLE 7
[Growth promoting effect of OMHP on *Aspergillus niger*]

| Concentration of added OMHP (p.p.m.) | Dry weight (mg.) | Nitrogen in cells (mg.) |
|---|---|---|
| (Control) 0 | 142 | 5.03 |
| 10 | 173 | 5.98 |
| 20 | 185 | 6.18 |

TABLE 8
[Growth promoting effect on *Penicillium funiculosum*]

| Concentration of added OMHP (p.p.m.) | Dry weight (mg.) | Nitrogen in cells (mg.) |
|---|---|---|
| (Control) 0 | 136 | 3.44 |
| 5 | 170 | 5.08 |

EXAMPLE 7

89 ml. of a Haydack culture solution having been prepared and sterilized as usual and 10 ml. of an aqueous solution of OMHP having been sterilized by ultra-violet irradiation were introduced in a 300 ml. shaking flask. In the case of control run, 10 ml. of a sterilized water was used instead of the aqueous solution of OMHP. One ml. of a suspension of pre-cultured *Saccharomyces sake* was inoculated to the content of the shaking flask. The shaking flask was subjected to a shaking culture at a temperature of 28° C. for 24 hours. The growth of the cells was estimated by turbidity measurement by means of photo-electric photometer. The results expressed in average specific turbidities of each 3 replicates are shown in Table 9 relative to those of control.

TABLE 9

| Concentration of added OMHP (p.p.m.) (control): | |
|---|---|
| 0 | 100 |
| 10 | 112 |
| 25 | 121 |

What is claimed is:

1. A method for promoting the growth of microorganisms which comprises culturing microorganisms in a culture medium containing sufficient amounts of a carbon source, a nitrogen source and mineral elements, and at least one member selected from the group consisting of 2-oxo-4-methyl-6-ureido-hexahydropyrimidine, and 2-oxo-4-methyl-6-hydroxy-hexahydropyrimidine in an amount effective to accelerate the growth of the microorganisms.

2. A method as claimed in claim 1 in which the microorganisms are bacteria.

3. A method as claimed in claim 1 in which the microorganisms are fungi.

4. A method as claimed in claim 1 in which the microorganisms are actinomycetes.

5. A method as claimed in claim 1 in which the microorganism is yeast.

6. A method as claimed in claim 1 in which the amount of the hexahydropyrimidine is from 1 to 200 p.p.m.

7. A culture medium for promoting the growth of microorganisms which contains sufficient amounts of a carbon source, a nitrogen source and mineral elements, and at least one member selected from the group consisting of a 2-oxo-4-methyl-6-ureido-hexahydropyrimidine, and 2-oxo-4-methyl-6-hydroxy hexahydropyrimidine in an amount effective to accelerate the growth of microorganisms.

References Cited

UNITED STATES PATENTS 3,235,364    2/1966    Siegel           195—114 XR
3,293,145   12/1966    Leavitt et al.    195—80

ALVIN E. TANENHOLTZ, Primary Examiner

U.S. Cl. X.R.

195—100, 96, 82, 81